Patented Feb. 13, 1940

2,190,022

UNITED STATES PATENT OFFICE 2,190,022

RESOLVING EMULSIONS

Oscar F. Hedenburg, Pittsburgh, Pa., assignor to Rex Research Corporation, Toledo, Ohio, a corporation of Delaware No Drawing. Application June 28, 1938,
Serial No. 216,386

1 Claim. (Cl. 260—454)

My invention relates to the resolving of emulsions and consists in a method of resolving emulsions of aqueous solutions of salt in organic liquids substantially insoluble in water, typically oil. It finds practical application in various circumstances, and, among other, in the purifying of petroleum from wells that have been treated with acid, ordinarily sulphuric acid, to increase the yield.

In a companion application for Letters Patent I have described the production of a new composition of matter, an aromatic alkyl thiocyanate, in which the thiocyan group is attached to the alkyl group. The procedure consists in adding to β (o-methyl phenoxy) β' chlorethyl ether, sodium thiocyanate, with a catalyst, and heating, with agitation. Reaction takes place, according to the equation—

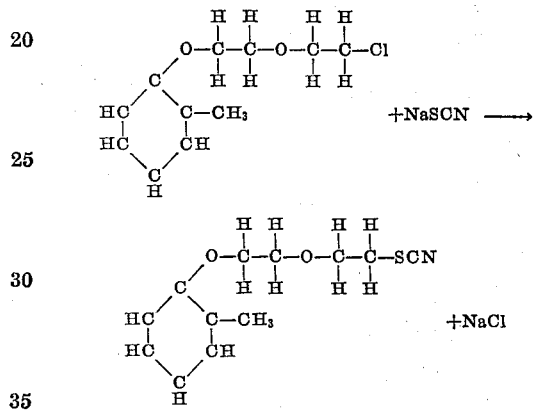

This is a liquid of oily character (though not commonly spoken of as an oil), and it is not subject to mutual solution with water.

To the reacted product, water may be added, to effect solution of the contained NaCl; but in such case an emulsion may be brought about; and a problem then arises, how to resolve the emulsion and recover the thiocyanate.

I have discovered that, if the emulsion be caused to percolate through a bed of salt (NaCl) in solid and crystalline state, the shell of emulsion that protects the brine globules will be broken, and the effluent then may be resolved, and its constituents readily separated. Ordinarily this may be allowed to occur under gravity, and the thiocyanate may then be decanted from the subjacent brine.

Petroleum as it comes from wells that have been treated with acid carries in emulsified condition a burden of salt solution; and the salt so carried becomes an agency of deterioration and destruction of pipes and apparatus in which the petroleum is carried and treated. I have found that by passing the petroleum through a bed of salt the condition of emulsion is changed. The effluent, then, under suitable influence, may be resolved and its constituents readily separated one from another. The separation may be effected in any known manner, as by subjecting it to the action of a centrifuge; but, conveniently, the separation will be effected under gravity; and the purified petroleum may be decanted from the brine.

It is convenient to provide the bed of salt in the form of a column and to cause the petroleum emulsion to descend through the column by gravity from above. Advantageously the column of crystalline salt may be of graded particle size and of increasing fineness from below upwardly. It suffices, however, that the petroleum emulsion be carried into and through the body of salt in any suitable manner, as by increase of pressure upon the entering liquid or by reduction of pressure upon the emerging liquid.

The effect may be heightened by repeated percolation either through the same bed or through successive beds; or the oil decanted from the brine after one operation may be subjected to a second operation by causing it again to pass through a bed of salt.

The effluent from the salt bed is in any case subject to an operation of separation; ordinarily it is allowed to stand in a suitable container. Its condition is so far altered from that of the initial petroleum emulsion that its components will separate under gravity. Thereupon the purified oil is drawn off from the subjacent brine.

I claim as my invention:

The method herein described of resolving an emulsion of an aqueous solution of sodium chloride in an aromatic alkyl thiocyanate, which consists in altering its condition by causing it to percolate through a body of sodium chloride in crystalline state, and separating the components of the effluent.

OSCAR F. HEDENBURG.